(12) United States Patent
Kim et al.

(10) Patent No.: US 8,540,412 B2
(45) Date of Patent: Sep. 24, 2013

(54) LIGHT GUIDE PLATE, METHOD OF MANUFACTURING THE SAME, AND LIQUID CRYSTAL DISPLAY DEVICE INCLUDING THE SAME

(75) Inventors: Hyoung-Joo Kim, Uiwang-si (KR); Heu-Gon Kim, Yongin-si (KR); In-Sun Hwang, Suwon-si (KR); Taek-Sun Shin, Cheonan-si (KR); Byung-Seo Yoon, Incheon (KR)

(73) Assignee: Samsung Display Co., Ltd. (KR)

( * ) Notice: Subject to any disclaimer, the term of this patent is extended or adjusted under 35 U.S.C. 154(b) by 308 days.

(21) Appl. No.: 12/838,560

(22) Filed: Jul. 19, 2010

(65) Prior Publication Data

US 2010/0277951 A1   Nov. 4, 2010

Related U.S. Application Data

(62) Division of application No. 12/113,448, filed on May 1, 2008, now abandoned.

(30) Foreign Application Priority Data

Jun. 22, 2007 (KR) ........................ 10-2007-0061513

(51) Int. Cl.
   *F21V 7/04* (2006.01)
(52) U.S. Cl.
   USPC .......................................... 362/617; 362/623
(58) Field of Classification Search
   USPC ........................................ 362/617, 623–626
   See application file for complete search history.

(56) References Cited

U.S. PATENT DOCUMENTS

| | | | |
|---|---|---|---|
| 4,729,068 A | 3/1988 | Ohe | |
| 5,477,422 A | 12/1995 | Hooker et al. | |
| 5,779,337 A | 7/1998 | Saito et al. | |
| 6,164,791 A | 12/2000 | Gwo-Juh et al. | |
| 6,259,854 B1 * | 7/2001 | Shinji et al. | 385/146 |
| 6,286,971 B1 | 9/2001 | Hori | |
| 6,386,721 B1 | 5/2002 | Hosseini et al. | |
| 6,406,158 B1 * | 6/2002 | Ohkawa | 362/625 |
| 6,522,373 B1 * | 2/2003 | Hira et al. | 362/603 |
| 6,659,615 B2 * | 12/2003 | Umemoto | 362/600 |
| 7,056,005 B2 * | 6/2006 | Lee | 362/625 |
| 7,400,817 B2 * | 7/2008 | Lee et al. | 385/146 |
| 7,458,712 B2 * | 12/2008 | Joo et al. | 362/623 |
| 7,682,063 B2 * | 3/2010 | Chen et al. | 362/624 |
| 7,740,391 B2 * | 6/2010 | Lai et al. | 362/625 |

(Continued)

FOREIGN PATENT DOCUMENTS

| | | |
|---|---|---|
| JP | 9-258030 | 10/1997 |
| KR | 1020050011547 A | 1/2005 |
| KR | 20-0393921 | 8/2005 |
| KR | 1020070028385 A | 3/2007 |

*Primary Examiner* — David J Makiya
(74) *Attorney, Agent, or Firm* — Cantor Colburn LLP

(57) ABSTRACT

A light guide plate includes a light incident surface to which light is incident as incident light, an opposite surface formed opposite to the light incident surface, a light emitting surface through which the incident light is emitted, a rear surface formed opposite to the light emitting surface and including a prism pattern which reflects the incident light to the light emitting surface, and lateral surfaces, wherein a diffuse reflection pattern is formed on at least any one of the light emitting surface and the lateral surfaces to diffuse-reflect light incident to the lateral surfaces, thus rendering a brightness at both the opposite surface and the light incident surface substantially uniform.

8 Claims, 12 Drawing Sheets

(56) References Cited

U.S. PATENT DOCUMENTS

| | | |
|---|---|---|
| 7,936,420 B2 * | 5/2011 | Kim et al. .................. 349/65 |
| 7,988,340 B2 * | 8/2011 | Kuo ........................... 362/331 |
| 2002/0030984 A1 * | 3/2002 | Ohkawa ..................... 362/31 |
| 2004/0105249 A1 * | 6/2004 | Yu et al. .................... 362/31 |
| 2005/0276073 A1 | 12/2005 | Mi et al. |
| 2007/0076435 A1 * | 4/2007 | Chang ........................ 362/626 |
| 2008/0205082 A1 * | 8/2008 | Chen et al. ................. 362/618 |

* cited by examiner

LIGHT GUIDE PLATE, METHOD OF MANUFACTURING THE SAME, AND LIQUID CRYSTAL DISPLAY DEVICE INCLUDING THE SAME

This application is a divisional of U.S. application Ser. No. 12/113,448, filed on May 1, 2008, which claims priority to Korean Patent Application No. 10-2007-0061513, filed on Jun. 22, 2007, and all the benefits accruing therefrom under 35 U.S.C. §119, the contents of which in its entirety are herein incorporated by reference.

BACKGROUND OF THE INVENTION

1. Field of the Invention

The present invention relates to a light guide plate, a method of manufacturing the same, and a liquid crystal display ("LCD") device including the same, and, more particularly, to a light guide plate emitting light with uniform brightness, a method of manufacturing the light guide plate, and an LCD device including the light guide plate.

2. Description of the Related Art

In general, an LCD device displays an image using a liquid crystal. The liquid crystal has electrical characteristics in which the alignment is changed according to the direction and intensity of an electric field, and optical characteristics in which the light transmittance is changed according to the alignment.

FIG. 1 is a plan view of a conventional LCD device in which the positions of test points for measuring brightness are shown.

The LCD device includes a liquid crystal panel 10 and a backlight unit. The liquid crystal panel 10 displays an image using light and a backlight unit provides the light to the liquid crystal panel 10.

The liquid crystal panel 10 includes a color filter substrate including a color filter array, a thin film transistor ("TFT") substrate including a TFT array, and a liquid crystal disposed between the two substrates. The backlight unit includes a light source generating light, such as lamp 28, a light guide plate guiding the light from the light source to the liquid crystal panel 10, and a plurality of optical sheets.

The backlight unit is formed on the rear surface of the liquid crystal panel 10 to provide light to the liquid crystal panel 10. In the conventional backlight unit, the amount of emitted light is reduced as a distance increases from the lamp 28 as the light source. Accordingly, there occurs a defect such is as a bright line in which the region adjacent to the lamp 28 is displayed brighter than the periphery in an effective display area displaying an image. That is, as shown in FIG. 2, test points 1, 6, 11, 16 and 21 positioned at the right side of the liquid crystal panel 10 and test points 5, 10, 15, 20 and 25 positioned at the left side of the liquid crystal panel 10 have brightness lower than test points in the center of the display area, such as test points 3, 8, 13, 18, and 23.

Moreover, in the case where the lamp 28 is used as the light source, there occurs a phenomenon in which the brightness measured at an opposite surface such as test points 16, 20, 21 and 25 is further lowered.

BRIEF SUMMARY OF THE INVENTION

It has been determined herein, according to the present invention, that there occurs display nonuniformity due to low brightness at both sides of a conventional liquid crystal panel. It has been further determined herein, according to the present invention, that brightness at opposite surfaces of a lamp is restricted in a conventional backlight unit at both corners of a light incident surface of a light guide plate due to a non-emissive area of the lamp.

The present invention thus provides a light guide plate including a diffuse reflection pattern to provide uniform brightness, a method of manufacturing the same, and a liquid crystal display ("LCD") device including the same.

In accordance with exemplary embodiments of the present invention, there is provided a light guide plate including a light incident surface to which light is incident as incident light, an opposite surface formed opposite to the light incident surface, a light emitting surface through which the incident light is emitted, a rear surface formed opposite to the light emitting surface and including a prism pattern which reflects the incident light to the light emitting surface, and lateral surfaces, wherein a diffuse reflection pattern is formed on at least any one of the light emitting surface and the lateral surfaces to diffuse-reflect the light incident to the lateral surfaces, thus rendering a brightness at both the opposite surface and the light incident surface substantially uniform.

The area of the diffuse reflection pattern may decrease as a distance increases from the light incident surface toward the opposite surface. The diffuse reflection pattern may have an average roughness decreased as a distance increases from the light incident surface toward the opposite surface. The diffuse reflection pattern may be formed in a range of about 80% to about 95% of a length from the light incident surface to the opposite surface.

The prism pattern may include a plurality of intaglio prism lines extending substantially parallel to the light incident surface. A size of the intaglio prism lines may gradually increase as a distance increases from the light incident surface toward the opposite surface. The size of at least any one of the intaglio prism lines formed in a region adjacent to the opposite surface may decrease as a distance increases from the lateral surfaces to a central region thereof.

The light emitting surface may further include a second prism pattern including a plurality of relief prism lines, in which a groove and a projection are repeatedly formed, and which extend in a direction crossing a direction of extension of the intaglio prism lines.

The rear surface may further include at least one reflection pattern is formed in a prism shape between prism lines of the prism pattern to reflect light to the light emitting surface. The reflection pattern may be formed within a region of the rear surface occupying about 10% of a length between the lateral surfaces, and the region is disposed adjacent at least one of the lateral surfaces. The reflection pattern may be formed in any one of relief and intaglio patterns. The reflection pattern may have a vertex angle in a range of about 130° to about 140°. The reflection pattern may have a height in a range of about 1 μm to about 10 μm from the rear surface and a width in a range of several tens or several hundreds of micrometers. A number of the reflection patterns may increase as a distance increases from the light incident surface toward the opposite surface. At least any one of the height and the width of the reflection pattern may gradually increase as a distance increases from the light incident surface toward the opposite surface.

In accordance with other exemplary embodiments of the present invention, there is provided an LCD device including a liquid crystal panel displaying an image, a light source generating light, and a light guide plate including a light incident surface to which the light supplied from the light source is incident as incident light, an opposite surface formed opposite to the light incident surface, a light emitting surface through which the incident light is emitted, a rear surface formed opposite to the light emitting surface and including a prism pattern which reflects the incident light to the light emitting surface, and lateral surfaces, wherein a diffuse reflection pattern is formed on at least any one of the light emitting surface and the lateral surfaces to diffuse-reflect light incident to the lateral surfaces, thus rendering a brightness at both is the opposite surface and the light incident surface substantially uniform.

The diffuse reflection pattern of the light guide plate may be formed in a range of about 80% to about 95% of a length from the light incident surface to the opposite surface.

The prism pattern may be formed with a plurality of intaglio prism lines extending substantially parallel to the light incident surface on the rear surface, and a height of the intaglio prism lines formed in a region adjacent to the opposite surface may decrease as a distance increases from the lateral surfaces to a central region thereof.

The light guide plate may further include at least one reflection pattern projected in a prism shape from the rear surface.

In accordance with still other exemplary embodiments of the present invention, a method of manufacturing a light guide plate includes forming a light incident surface to which light is incident, an opposite surface formed opposite to the light incident surface, a light emitting surface through which incident light is emitted, a rear surface formed opposite to the light emitting surface, and lateral surfaces, forming a prism pattern including a plurality of intaglio prism lines on the rear surface, and forming a diffuse reflection pattern on at least any one of the light emitting surface and the lateral surfaces to diffuse-reflect light incident to the lateral surfaces, thus rendering a brightness at both the opposite surface and the light incident surface uniform.

In forming the diffuse reflection pattern, the diffuse reflection pattern may be formed in a range of about 80% to about 95% of a length from the light incident surface to the opposite surface.

Forming the prism pattern including a plurality of intaglio prism lines on the rear surface may further include forming a reflection pattern in any one of relief and intaglio patterns on the rear surface to reflect light incident between the intaglio prism lines to the light emitting surface.

BRIEF DESCRIPTION OF THE DRAWINGS

The above and/or other aspects, features and advantages of the present invention will now become more apparent from the following detailed description when taken in conjunction with the accompanying drawings, in which.

DETAILED DESCRIPTION OF THE INVENTION

Figure 1:
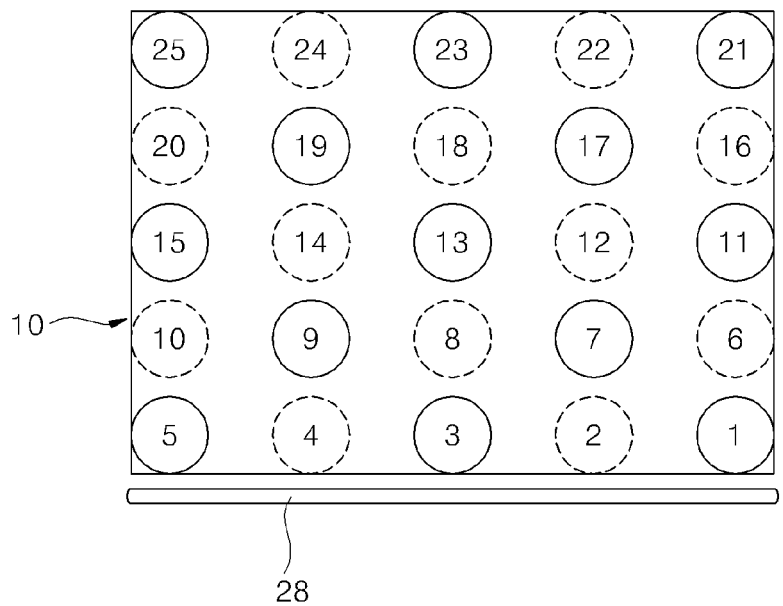
FIG. 1 is a plan view showing test points for measuring brightness at respective points of a liquid crystal panel in a conventional liquid crystal display ("LCD") device according to the prior art.
Figure 2:
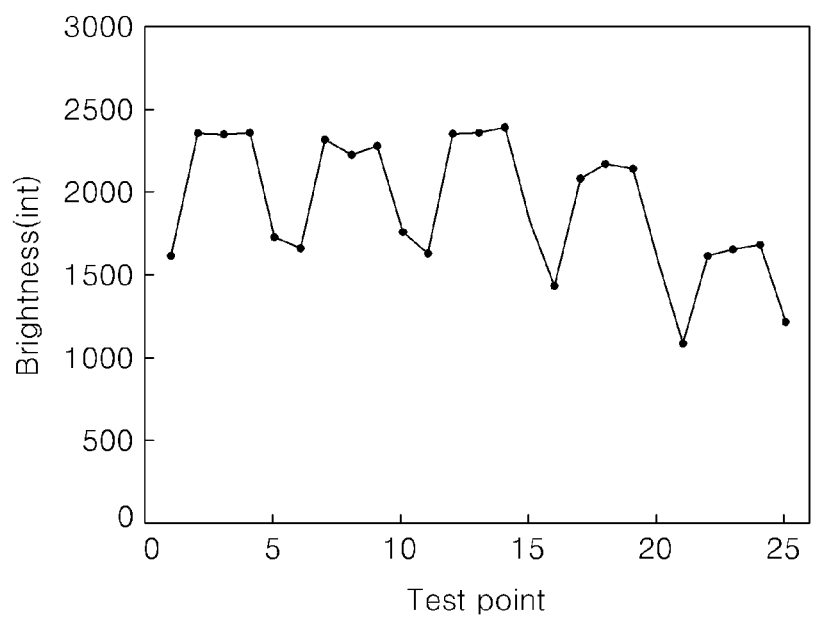
FIG. 2 is a graph showing the brightness measured at the test points of FIG. 1.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other is elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 3:
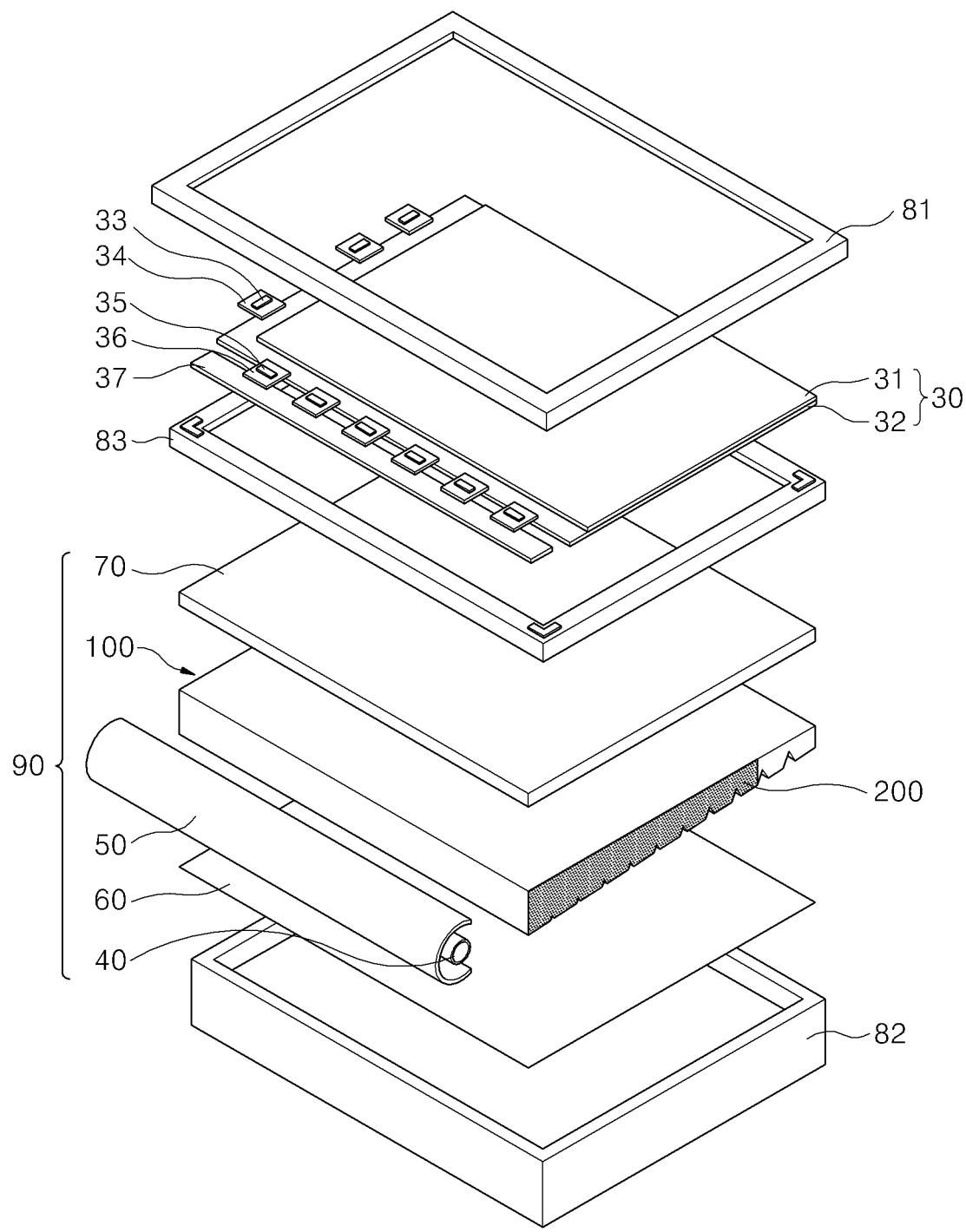
FIG. 3 is an exploded perspective view showing an exemplary embodiment of an LCD device in accordance with the present invention.

FIG. 3 is an exploded perspective view showing an exemplary embodiment of liquid crystal display ("LCD") device in accordance the present invention.

An exemplary embodiment of the LCD device in accordance with the present invention includes a liquid crystal panel 30, a gate driver 33 and a data driver 35 for driving the liquid crystal panel 30, a backlight unit 90 for supplying light to the liquid crystal panel 30, and a bottom chassis 82 and a top chassis 81 for accommodating the liquid crystal panel 30 and the backlight unit 90.

In particular, the liquid crystal panel 30 has a structure in which a color filter substrate 31 including a color filter array is bonded to a thin film transistor ("TFT") substrate 32 including a TFT array with a liquid crystal disposed therebetween. A plurality of sub-pixels independently driven by the TFTs is arranged in a matrix form on the liquid crystal panel 30. Each sub-pixel controls the liquid crystal alignment and the light transmittance to display an image according to a difference between a common voltage supplied to a common electrode and a pixel electrode applied to a pixel electrode through the TFT. In this case, since the liquid crystal panel 30 is a non-emissive display device, the light generated from the backlight unit 90 is used.

The gate driver 33 drives a gate line formed on the TFT substrate 32. The gate driver 33 may be mounted on a gate circuit film 34, and the gate circuit film 34 equipped with the gate driver 33 may be connected to one side of the TFT substrate 32 to supply a gate driving signal from the gate driver 33 to the gate line of the liquid crystal panel 30.

The data driver 35 drives a data line formed on the TFT substrate 32. The data driver 35 may be mounted on a data circuit film 36. One side of the data circuit film 36 may be connected to the TFT substrate 32 and the other side thereof is connected to a printed circuit board ("PCB") 37. The gate circuit film 34 and the data circuit film 36 shown in FIG. 3 are a chip-on-film ("COF") or a tape carrier package ("TCP"). In an alternative exemplary embodiment, the gate driver 33 and the data driver 35 may be mounted on the TFT substrate 32 by a chip-on-glass ("COG") method or directly mounted on the TFT substrate 32 during the formation of the TFT.

The bottom chassis 82 accommodates the backlight unit 90. In this case, the backlight unit 90 is accommodated in a mold frame 83 as shown.

The top chassis 81 is formed to surround the circumference of the top of the liquid crystal panel 30, i.e., a non-display area of the top surface of the liquid crystal panel 30, and fixes the liquid crystal panel 30. For this, the top chassis 81 has a substantially 'L' shaped cross-section and is coupled to the bottom chassis 82.

The backlight unit 90 includes a light source 40, a light source cover 50, a light guide plate 100 for guiding light from the light source 40, a reflection sheet 60 disposed at the bottom of the light guide plate 100, and an optical sheet unit 70 disposed at the top of the light guide plate 100.

The light source 40 is arranged on one side of the light guide plate 100 and supplies light to the light guide plate 100. In the illustrated embodiment, a lamp is used as the light source 40. However, in an alternative exemplary embodiment, a light emitting diode ("LED") may be used as the light source 40.

The light source cover 50 is arranged to at least partially surround the circumference of the light source 40, thus protecting the light source 40 from an external physical impact. An interior of the light source cover 50 may include a reflective surface such that the light source cover 50 reflects the light generated from the light source 40 to a light incident surface of the light guide plate 100, thus increasing the light emission efficiency.

The optical sheet unit 70 is provided on the top of the light guide plate 100. The optical sheet unit 70 may include a diffusion sheet, a prism sheet and a protective film. The optical sheet unit 70 uniformly diffuses the light emitted from a light emitting surface of the light guide plate 100 and collects the diffused light to be supplied toward the liquid crystal panel 30.

The reflection sheet 60 is disposed on a rear surface 150 of the light guide plate 100, as will be further described with respect to the following figures, to reflect the light supplied to the rear surface 150 of the light guide plate 100 toward the top of the light guide plate 100, such that light may exit the light emitting surface of the light guide plate 100.

The light guide plate 100 guides light from the light source 40 to be supplied to the liquid crystal panel 30 disposed at the top thereof. As will be further described below, the light guide plate 100 includes a diffuse reflection pattern 200 formed on at least one of a light emitting surface 130 and lateral surfaces 140 in order to supply light from a light incident surface 110 to the liquid crystal panel 30 with a uniform brightness distribution. The diffuse reflection pattern 200 will be described in more detail with reference to FIGS. 4 to 6.

Figure 4:
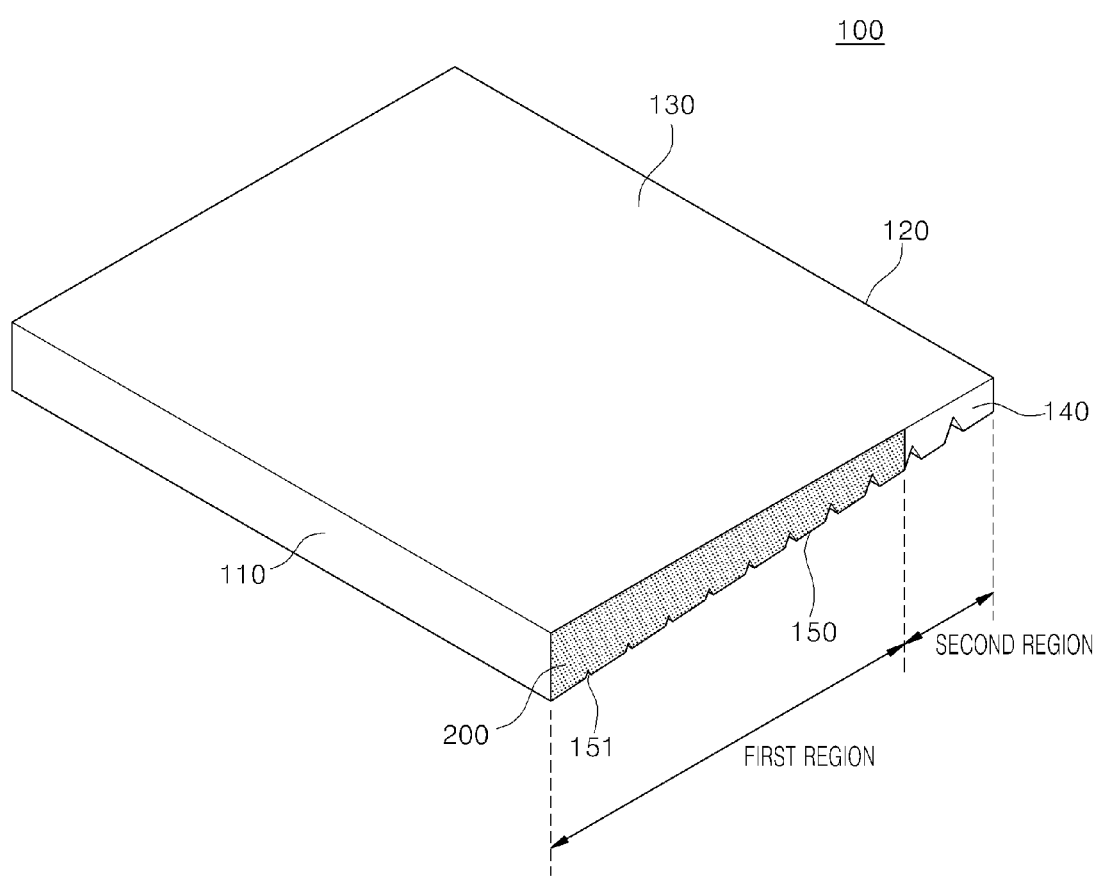
FIG. 4 is a perspective view showing a first exemplary embodiment of a light guide plate in accordance with the present invention in the exemplary LCD device of FIG. 3.

FIG. 4 is a perspective view illustrating the exemplary light guide plate shown in FIG. 3.

The first exemplary embodiment of the light guide plate 100 in accordance with the present invention includes a light incident surface 110, an opposite surface 120, a light emitting surface 130, a rear surface 150, and lateral surfaces 140. The opposite surface 120 is formed opposite to the light incident surface 110. The light emitting surface 130 is formed opposite to the rear surface 150 to supply light reflected from the rear surface 150 toward the liquid crystal panel 30.

The rear surface 150 is formed opposite to the light emitting surface 130. Moreover, the rear surface 150 includes a prism pattern 151 formed to supply light, and the prism pattern 151 may be provided from the light incident surface 110 up to the opposite surface 120.

The prism pattern 151 includes a plurality of intaglio prism lines. In other words, the prism pattern 151 includes a plurality of longitudinally extending lines that are indented from the rear surface 150, and each of which extends in a direction substantially parallel to the light incident surface 110. The size of the intaglio prism lines is increased as it proceeds from the light incident surface 110 toward the opposite surface 120. That is, a size of a prism line adjacent the light incident surface 110 is less than a size of a prism line further from the light incident surface 110, such as adjacent the opposite surface 120. The light emitted from the light source 40 to the light incident surface 110 is supplied up to the opposite surface 120. Moreover, with the prism pattern 151, it may be possible to eliminate the diffusion sheet disposed at the top of a conventional light guide plate, thus reducing the thickness and cost of the backlight unit 90. The prism pattern 151 will be described in more detail with reference to FIG. 7.

The light guide plate 100 includes a pair of opposing lateral surfaces 140, one of which will be described herein. The lateral surface 140 includes a first region in which the diffuse reflection pattern 200 is formed and a second region in which the diffuse reflection pattern 200 is not formed in order to increase the brightness of both corners of the light guide plate 100 adjacent the opposite surface 120. The first region has a length of about 80% to about 95% of the total length from the light incident surface 110 to the opposite surface 120. The second region has a length of about 5% to about 20% of the total length from the light incident surface 110 to the opposite surface 120. If the second region had a length 5% or less of the total length, i.e., if the diffuse reflection pattern 200 is formed more than 95% of the total length from the light incident surface 110 to the opposite surface 120, then the amount of light supplied toward the opposite surface 120 would be reduced and thus the brightness of both corners at the opposite surface 120 would not be increased.

Moreover, if the diffuse reflection pattern 200 is formed less than 80% of the total length from the light incident surface 110 to the opposite surface 120, then the brightness of both corners adjacent the opposite surface 120 would be reduced. In other words, the light that should be supplied toward the opposite surface 120 would instead be applied to the light emitting surface 130 and thus the amount of light supplied to the opposite surface 120 would be reduced.

Here, the area of the diffuse reflection pattern 200 formed in the first region is reduced as it proceeds from the light incident surface 110 toward the opposite surface 120. The diffuse reflection pattern 200 is formed with a predetermined shape such as a triangle, a quadrangle, etc. on the first region.

Moreover, the average roughness of the diffuse reflection pattern 200 may be reduced as it proceeds from the light incident surface 110 toward the opposite surface 120. In other words, at least any one of the density and size of fine dots is reduced as the diffuse reflection pattern 200 proceeds from the light incident surface 110 toward the opposite surface 120.

For example, a greater deal of fine dots may be formed on the lateral surface 140 adjacent the light incident surface 110 and the amount decreases as it goes away from the light incident surface 110 such that the diffuse reflection pattern 200 diffuse-reflects a greater deal of light adjacent the light incident surface 110 than adjacent to the opposite surface 120.

Furthermore, the diffuse reflection pattern 200 has the same effect as is described above by forming the fine dots having a size increasing as they proceed from the light incident surface 110 toward the opposite surface 120, thus increasing the brightness of both corners of the light guide plate 100 adjacent the opposite surface 120 of the light guide plate 100.

Accordingly, the diffuse reflection pattern 200 diffuses, diffuse-reflects, or refracts the light from the lateral surface 140 adjacent the light incident surface 110 to supply a greater deal of light to the lateral surface 140 adjacent the opposite surface 120, thus increasing the brightness of both corners of the light guide plate 100 adjacent the opposite surface 120.

The first exemplary embodiment of the diffuse reflection pattern 200 in accordance with the present invention may be formed by a surface roughness treatment such as sand blasting or any methods capable of achieving the same effect.

For example, the diffuse reflection pattern 200 may be formed on the lateral surfaces 140 of the light guide plate 100 directly by sand blasting. Moreover, the diffuse reflection pattern 200 may be formed on the light guide plate 100 by forming fine dots such as a hemisphere, a cylindrical column, or a polygonal prism on a mold used for manufacturing the light guide plate 100. In the case where the fine dots are formed on the mold, they may be engraved in relief or in intaglio. With the sand blasting method, the fine dots are engraved in intaglio with indentations formed in the mold such that the diffuse reflection pattern 200 is formed in relief after the injection molding of the light guide plate 100. When the fine dots are formed on the mold in the above-described manner, it is possible to improve the reproducibility and reduce the manufacturing cost during the mass production of the light guide plate 100.

Figure 5:
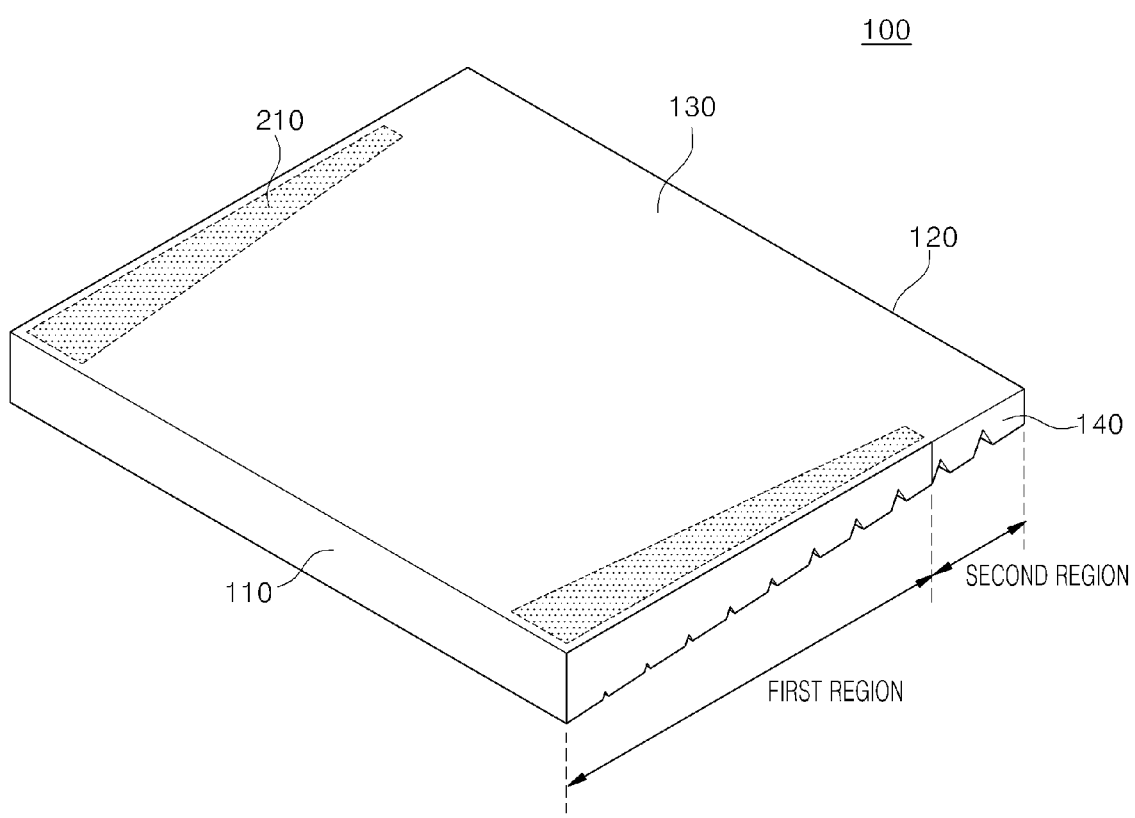
FIG. 5 is a perspective view showing a second exemplary embodiment a light guide plate in accordance with the present invention.

FIG. 5 is a perspective view showing a second exemplary embodiment of a light guide plate in accordance with the present invention.

The light guide plate of FIG. 5 may have substantially the same components as that of FIG. 4, except for the diffuse reflection pattern 200 being formed on the light emitting surface 130, and therefore a repeated description of the same elements thereof will be omitted.

Referring to FIG. 5, the second exemplary embodiment of the light guide plate 100 in accordance with the present invention includes a diffuse reflection pattern 210 formed on opposing sides of the light emitting surface 130 adjacent the lateral surfaces 140.

In particular, the diffuse reflection pattern 210 is formed in a predetermined region of the light emitting surface 130 coming in contact with or directly adjacent to both lateral surfaces 140 of the light guide plate 100. The area of the diffuse reflection pattern 210 adjacent the light incident surface 110 is greater than that adjacent the opposite surface 120. For example, the diffuse reflection pattern 210 may be formed in a triangular or trapezoidal shape, with a larger width of each shape formed adjacent the light incident surface 110, and decreasing as the shape approaches the opposite surface 120. In other words, the area of the diffuse reflection pattern 210 adjacent to the light incident surface 110 is greater than that of the diffuse reflection pattern 210 adjacent to the opposite surface 120. Such a diffuse reflection pattern 210 may be formed to have a uniform average roughness throughout the diffuse reflection pattern 210. Alternatively, the diffuse reflection pattern 210 may be formed to have an average roughness adjacent the light incident surface 110 greater than that closer to the opposite surface 120.

Meanwhile, the diffuse reflection pattern 210 is not formed in the second region adjacent to the opposite surface 120. Similar to the diffuse reflection pattern 200 of FIG. 4, the area of the diffuse reflection pattern 210 is reduced as a distance increases from the light incident surface 110 and the diffuse reflection pattern 210 is not formed in the second region. Since the effect thereof is the same as described with respect to FIG. 4, a detailed description thereof will be omitted. Here, the first region is defined as about 80% to about 95% of the total length between the light incident surface 110 and the opposite surface 120, and the second region is defined in the remaining length. Since the description thereof has been given in detail with reference to FIG. 4, the repeated description thereof will be omitted.

As described above in the first exemplary embodiment and shown in FIG. 4, the diffuse reflection pattern 210 may be formed in such a manner that fine dots corresponding to the diffuse reflection pattern 210 are formed on the surface of a mold corresponding to the light emitting surface 130 and then the light guide plate 100 may be injection molded.

Figure 6:
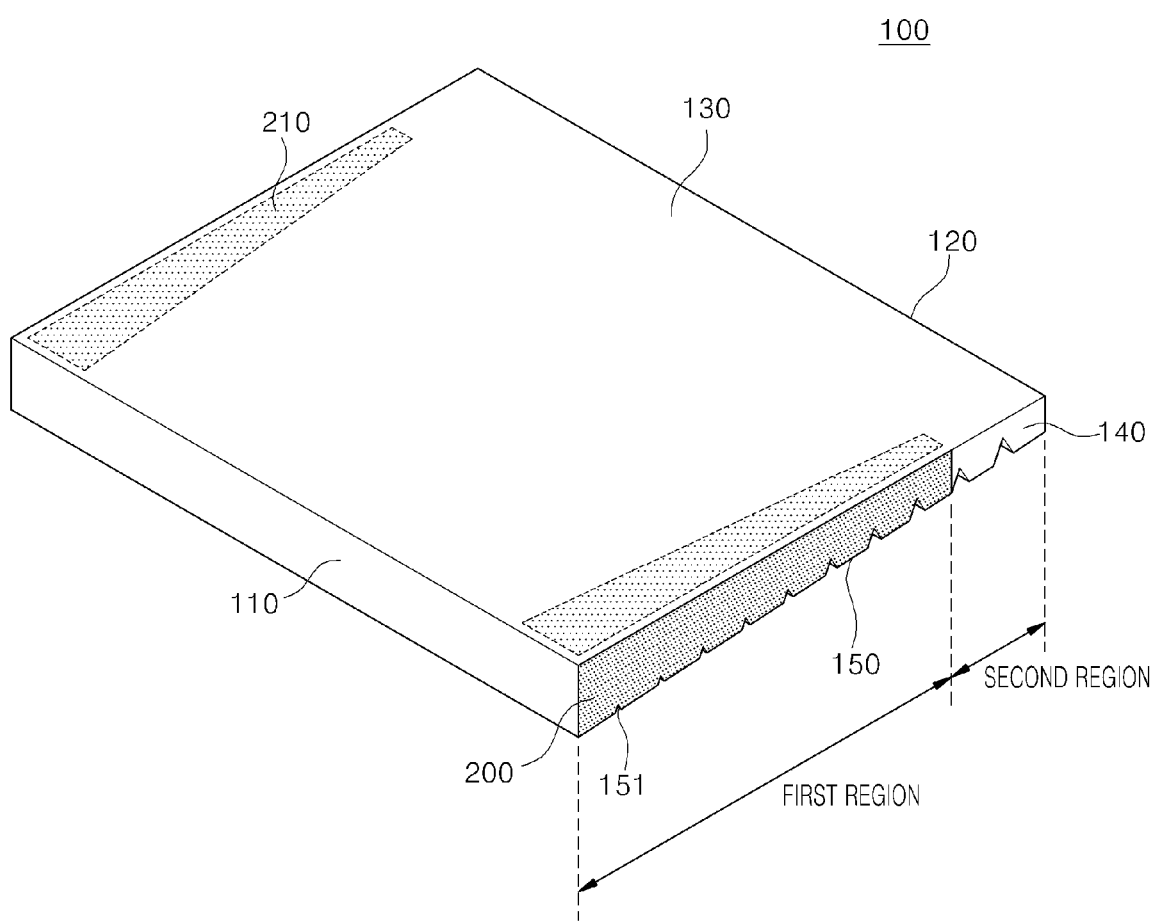
FIG. 6 is a perspective view showing a third exemplary embodiment of a light guide plate in accordance with the present invention.

FIG. 6 is a perspective view showing a third exemplary embodiment of a light guide plate in accordance with the present invention, in which the diffuse reflection pattern 200 is formed on both the lateral surfaces 140 and the diffuse reflection pattern 210 is formed on the light emitting surface 130.

In this exemplary embodiment, the diffuse reflection pattern includes a first diffuse reflection pattern 200 formed on the lateral surfaces 140 and a second diffuse reflection pattern 210 formed on the light emitting surface 130.

The first diffuse reflection pattern 200 is formed on at least any one of the lateral surfaces 140 of the light guide plate 100. The first diffuse reflection pattern 200 may be formed on both lateral surfaces 140 of the light guide plate 100. The first diffuse reflection pattern 200 is formed in the first region of the light guide plate 100. As described with reference to FIG. 4, the first diffuse reflection pattern 200 may be formed in a triangular or quadrangular shape in the first region. The first diffuse reflection pattern 200 may be formed to have a uniform average roughness in the first region or to have an average roughness decreased as it proceeds from the light incident surface 110 toward the opposite surface 120.

The second diffuse reflection pattern 210 is formed on the light emitting surface 130 of the light guide plate 100. The second diffuse reflection pattern 210 is formed along the regions where the light emitting surface 130 meets both the lateral surfaces 140 or adjacent to the lateral surfaces 140. The second diffuse reflection pattern 210 may be formed in a triangular or quadrangular shape in the first region. The second diffuse pattern 210 may be formed to have an area reduced gradually as it proceeds from the light incident surface 110 toward the opposite surface 120. Moreover, the second diffuse reflection pattern 210 may be formed to have an average roughness decreased as it proceeds from the light incident surface 110 toward the opposite surface 120.

Figure 7:
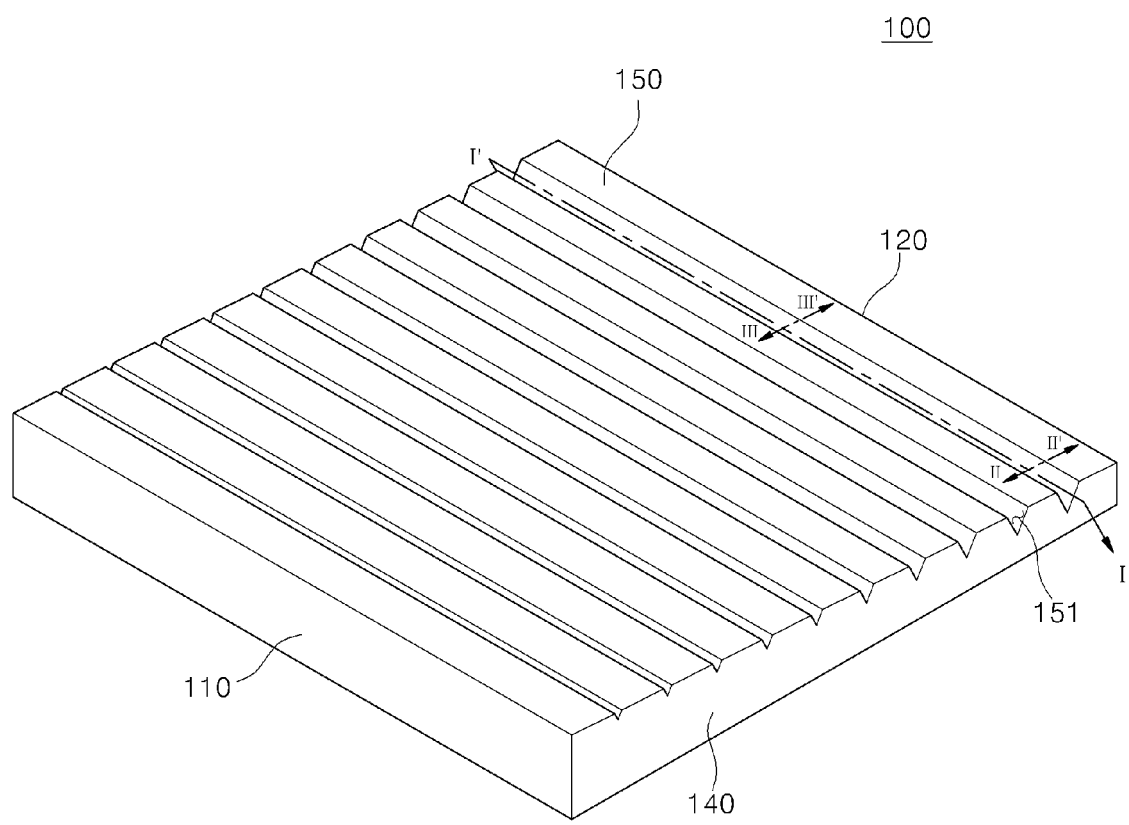
FIG. 7 is a perspective view showing a fourth exemplary embodiment of a rear surface of a light guide plate in accordance with the present invention.
Figure 8:
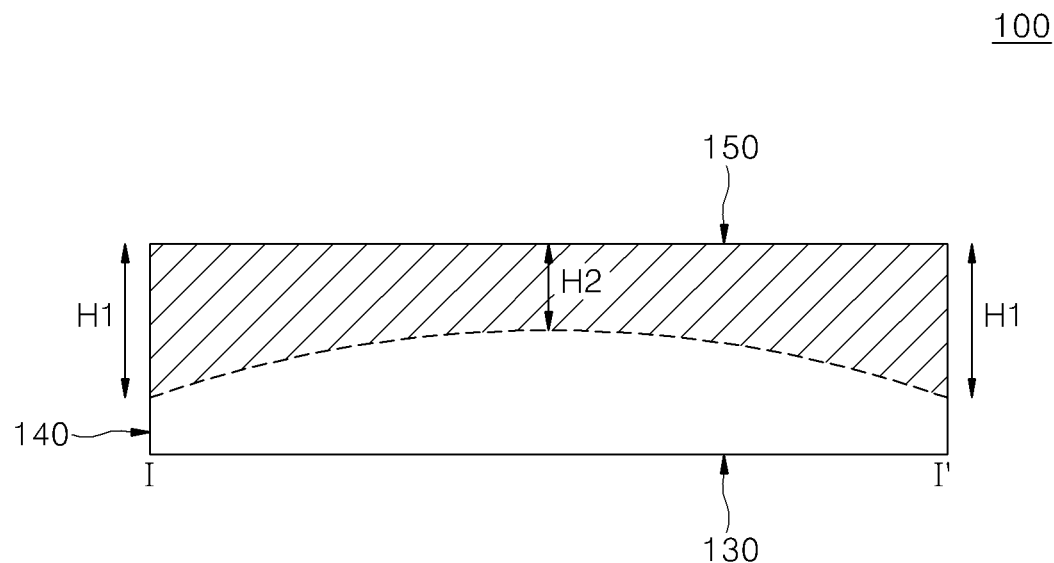
FIGS. 8 to 10 are cross-sectional views taken along lines I-I', II-II', and III-III' of FIG. 7, respectively.
Figure 9:
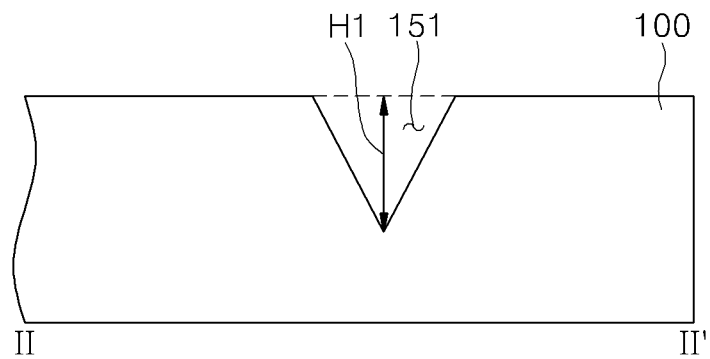
Figure 10:
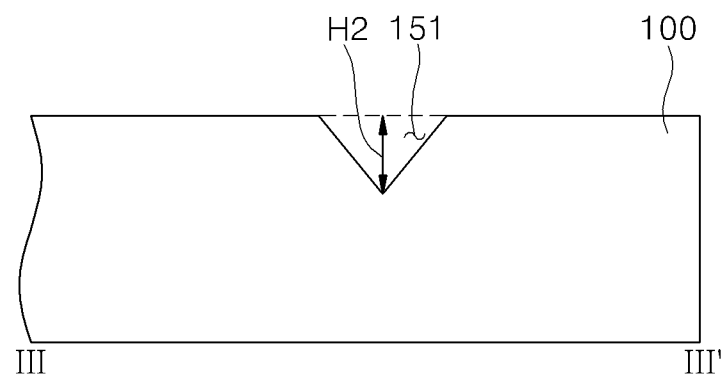

FIG. 7 is a perspective view showing a fourth exemplary embodiment of a rear surface of a light guide plate in accordance with the present invention, FIG. 8 is a cross-sectional view taken along line I-I' of FIG. 7, FIG. 9 is a cross-sectional view taken along line II-II' of FIG. 7, and FIG. 10 is a cross-sectional view taken along line III-III' of FIG. 7.

Referring to FIGS. 7 to 10, the fourth exemplary embodiment of the light guide plate 100 in accordance with the present invention is formed on the rear surface 150 and includes a prism pattern 151 having a plurality of intaglio prism lines formed in a region adjacent to the opposite surface 120.

In particular, the prism pattern 151 is engraved in intaglio on the rear surface 150 of the light guide plate 100, such that each indentation is indented from a surface of the rear surface 150. The distance between the intaglio prism lines of the prism pattern 151 may be the same. Moreover, the pitch of the intaglio prism line of the prism pattern 151 is in the range from about several tens to about several hundreds of micrometers.

The size of the prism pattern 151 is increased as a distance increases from the light incident surface 110 toward the opposite surface 120. The size/height of the intaglio prism line of the prism pattern 151 adjacent to the light incident surface 110 is relatively small and the size/height gradually increases as a distance increases from the light incident surface 110 toward the opposite surface 120. Accordingly, the light guide plate 100 reduces the amount of light reflected toward the light emitting surface 130 by the intaglio prism lines adjacent to the light incident surface 110 and increases the amount of light closer to the opposite surface 120 by supplying the remaining light toward the opposite surface 120.

Moreover, the height of the prism pattern 151, at least adjacent to the opposite surface 120, is reduced towards the center and is increased towards is both ends of each line. As shown in FIGS. 8 to 10, a height H1 of both sides of the intaglio prism line is greater than a height H2 of the center thereof. In other words, the height H1 of the prism pattern 151 adjacent to the lateral surface 140 of the light guide plate 100 is greater than the height H2 of the prism pattern 151 formed in the center or central region of the light guide plate 100. Since the prism pattern 151 forms an inclined surface for reflecting light to the light guide plate 100, the area of the inclined surface is varied according to the height of the prism pattern 151. In the cross-sectional view of FIG. 8, the slanted lines show the inclined surface. The area of the inclined surface at the lateral surface 140, in which the prism pattern 151 is formed larger in height, is larger than that of the center. Moreover, since the size of the prism pattern 151 is gradually reduced as it proceeds from the lateral surfaces 140 to the center or central region, the area of the inclined surface is also gradually reduced. Accordingly, since the amount of light reflected from the lateral surface 140 is greater than that reflected from the center or central region, the brightness of both corners of the light guide plate 100 adjacent the opposite surface 120 of the light guide plate 100 is increased.

The above-described prism pattern 151 may be formed in such a manner that prism patterns are engraved in relief with a prism shape on the surface of a mold corresponding to the rear surface 150 and then the light guide plate 100 is injection molded.

Figure 11:
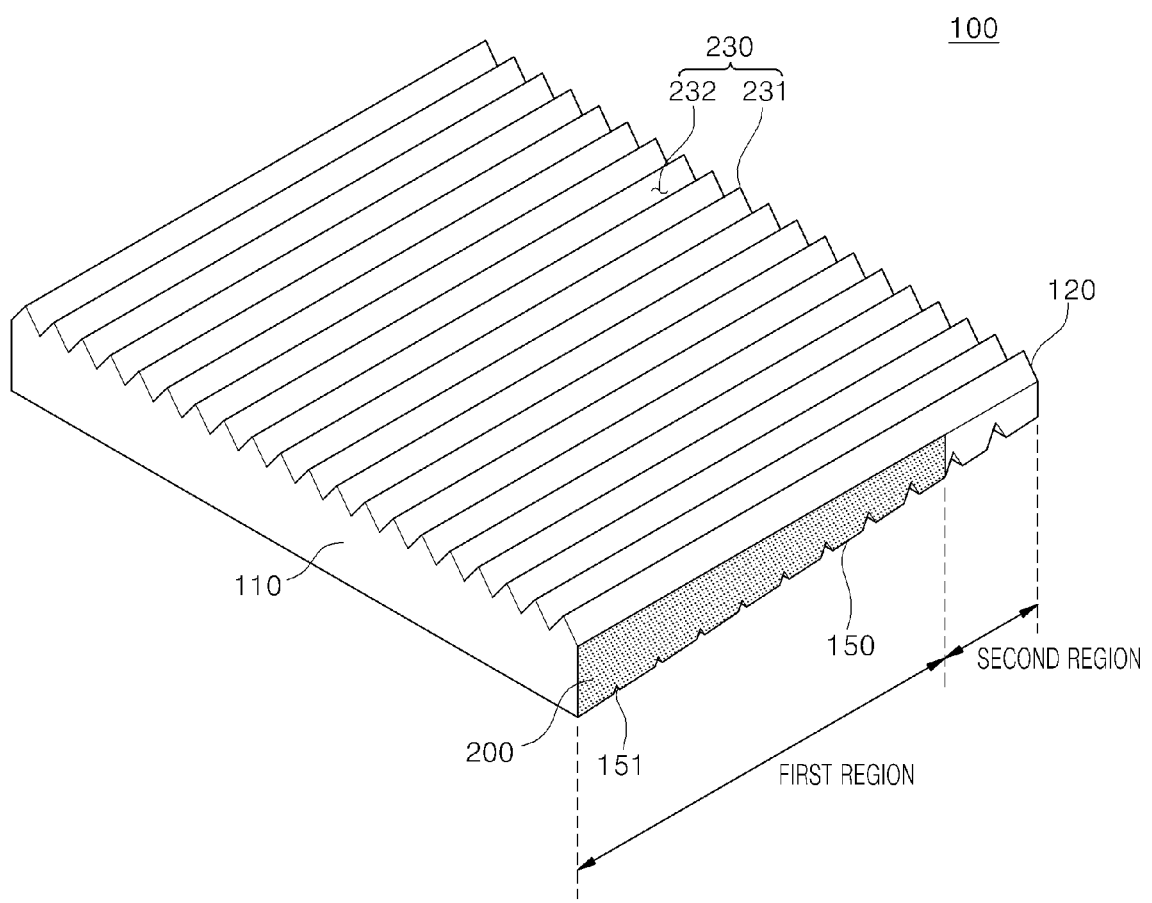
FIG. 11 is a perspective view showing a fifth exemplary embodiment of a light guide plate in accordance with the present invention.

FIG. 11 is a perspective view showing a fifth exemplary embodiment of a light guide plate in accordance with the present invention.

The fifth exemplary embodiment of the light guide plate 100 in accordance with the present invention further includes a second prism pattern 230 formed on the light emitting surface 130.

In particular, the second prism pattern 230 includes a plurality of relief prism lines in which a groove 232 and a projection 231 are repeatedly formed and extend from the light incident surface 110 to the opposite surface 120. The second prism pattern 230 collects light supplied from the light emitting surface 130 and supplies the collected light to the liquid crystal panel 30 disposed at the top of the backlight unit 90.

The relief prism lines of the second prism pattern 230 may be formed perpendicularly, or substantially perpendicularly, to the intaglio prism lines in the prism pattern 151 formed on the rear surface 150 of the light guide plate 100. The second prism pattern 230 formed on the light emitting surface 130 of the light guide plate 100 provides the same effect without using the optical sheets such as the diffusion sheet and the prism sheet employed in the conventional backlight unit. Accordingly, it is possible to reduce the thickness, weight, and cost of the backlight unit 90.

The above-described second prism pattern 230 may be formed in such a manner that prism lines are engraved in intaglio with a prism shape on the surface of a mold corresponding to the second prism pattern 230 and then the light guide plate 100 is injection molded.

Figure 12:
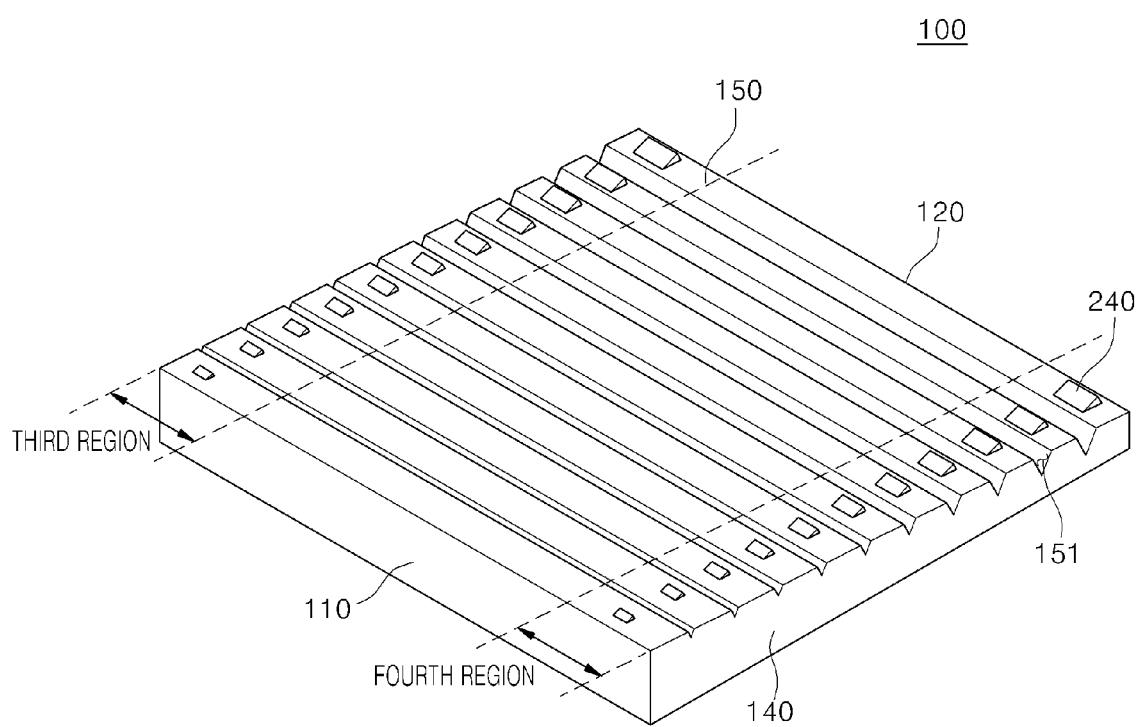
FIG. 12 is a perspective view showing a sixth exemplary embodiment of a rear surface a light guide plate in accordance with the present invention.
Figure 13:
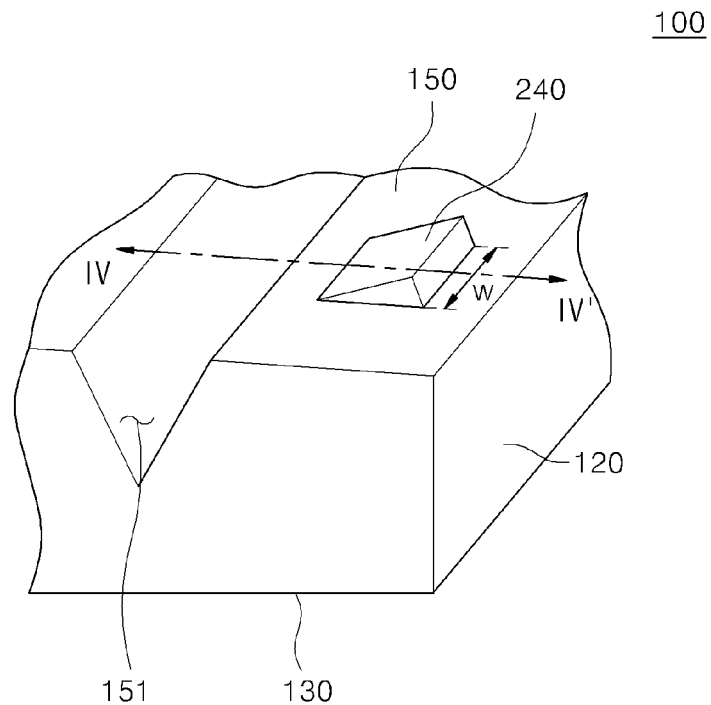
FIG. 13 is an enlarged perspective view of an exemplary reflection pattern shown in FIG. 12.
Figure 14:
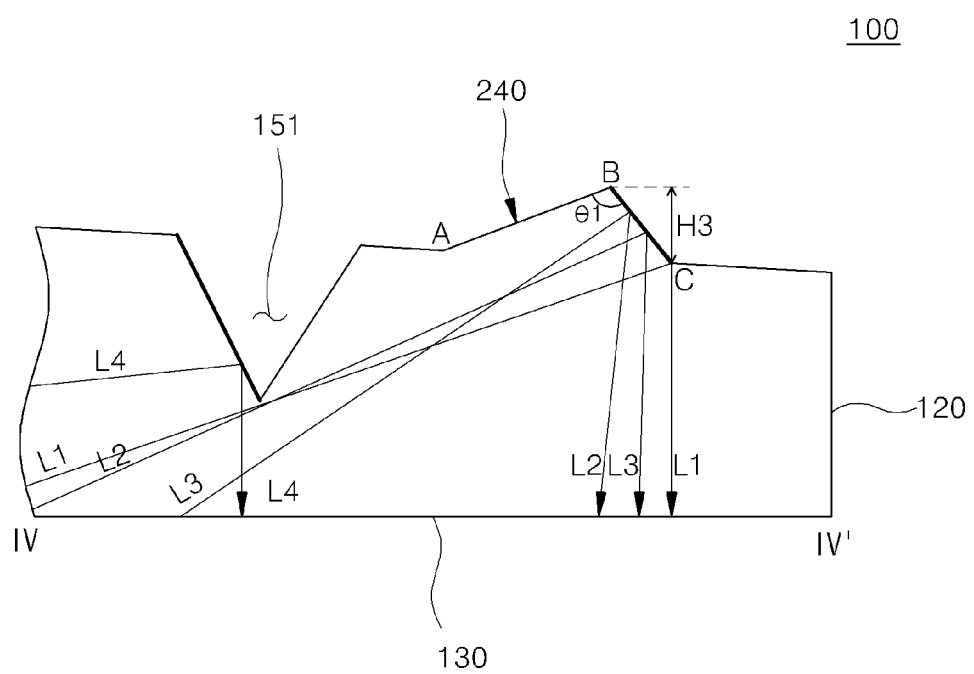
FIG. 14 is a cross-sectional view taken along line IV-IV' of FIG. 13.

FIG. 12 is a perspective view showing a sixth exemplary embodiment of a light guide plate in accordance with the present invention, FIG. 13 is an enlarged perspective view of an exemplary reflection pattern in the exemplary light guide plate of FIG. 12, and FIG. 14 is a cross-sectional view taken along line IV-IV' of FIG. 13.

Referring to FIGS. 12 to 14, the sixth exemplary embodiment of the light guide plate 100 in accordance with the present invention includes a reflection pattern 240 formed on the rear surface 150 adjacent to the lateral surfaces 140.

In particular, the reflection pattern 240 is formed in at least any one of both sides of the rear surface 150 adjacent to the lateral surfaces 140. The reflection pattern 240 is formed between intaglio prism lines of the prism pattern 151. Moreover, the reflection pattern 240 is form on the flat surface between the intaglio prism lines repeatedly arranged. In other words, the prism lines and the reflection patterns 240 are alternately arranged. Such a reflection pattern 240 may be formed in a third region and a fourth region, which are disposed adjacent the opposing lateral surfaces 140, respectively. The third and fourth regions are positioned within 10% of the total length between lateral surfaces 140 of the light guide plate 100. For example, in a case where the length between the lateral surfaces 140 of the light guide plate 100 is about 30 cm, the third and fourth regions correspond to the regions positioned within 3 cm from the lateral surfaces 140.

As shown in FIGS. 12 to 14, the reflection pattern 240 is engraved in relief from the rear surface 150. As shown in FIG. 14, light incident along a fourth light path L4 is reflected by the inclined surface of the prism pattern 151 and thus supplied vertically to the light emitting surface 130. Light incident along first to third light paths L1 to L3 is reflected by the reflection pattern 240 and thus emitted vertically to the light emitting surface 130. At this time, the reflection pattern 240 may supply light incident along other light paths than the first to third light paths L1 to L3 vertically to the light emitting surface 130.

The reflection pattern 240 has a vertex angle $\theta_1$ in the range of about 130° to about 140°. As shown in FIG. 14, the vertex angle $\theta_1$ of triangle ABC is formed about 130° to about 140°. The reflection pattern 240 has the maximum reflection efficiency when the vertex angle $\theta_1$ is 136°, or about 136°.

If the vertex angle $\theta_1$ is smaller than 130° or greater than 140°, then the amount of light incident to the inclined surface of the reflection pattern 240 and supplied vertically to the light emitting surface 130 would be reduced.

Moreover, the reflection pattern 240 has a height H3 in the range of about 1 μm to about 10 μm with respect to the flat surface of the rear surface 150. If the height H3 of the reflection pattern 240 is less than 1 μm, then the size of the reflection pattern 240 would become too small, and thus the amount of light reflected toward the light emitting surface 130 would be reduced. If the height H3 of the reflection pattern 240 is more than 10 μm, then the amount of light reflected toward the light emitting surface 130 would be increased, however, it may cause a defect such as scratch on a reflection sheet to be formed on the rear surface 150 when coming in contact with the reflection sheet. Moreover, the reflection pattern 240 has a width W of several or several tens of micrometers.

In an exemplary embodiment, the size of the reflection pattern 240 may be increased as a distance increases from the light incident surface 110 toward the opposite surface 120, and thus it is possible to increase the brightness of both sides of the light guide plate 100. For example, the width W of the reflection pattern 240 may be increased as a distance increases from the light incident surface 110 toward the opposite surface 120. That is, if the width W of the reflection pattern 240 adjacent the opposite surface 120 is greater than that of the reflection pattern 240 adjacent the light incident surface 110, the area for reflecting the incident light is increased towards the opposite surface 120, and thus it is possible to supply a greater deal of light toward the light emitting surface 130.

In an alternative exemplary embodiment, the reflection patterns 240 formed at the light incident surface 110 and the opposite surface 120 may have the same width W, and the reflection pattern 240 formed adjacent the opposite surface 120 may have a height H3 greater than that of the reflection pattern 240 formed adjacent the light incident surface 110.

In yet another exemplary embodiment, the number of the reflection patterns 240 may be increased as a distance increases from the light incident surface 110 toward the opposite surface 120, and thus it is possible to increase the brightness of both sides of the light guide plate 100. For example, since the brightness adjacent the light incident surface 110 adjacent to the light source 40 is greater than that adjacent the opposite surface 120, a greater number of reflection patterns 240 may be formed adjacent the opposite surface 120 in order to maintain a uniform brightness across the opposite surface 120. Accordingly, it is possible to supply a greater deal of light toward the light emitting surface 130 from an area adjacent the opposite surface 120 than from an area adjacent the light incident surface 110.

Figure 15:
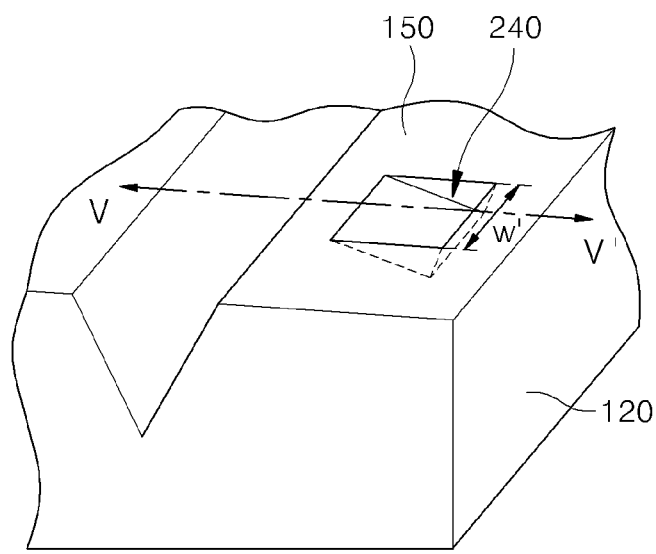
FIG. 15 is a perspective view showing an exemplary reflection pattern engraved in intaglio.
Figure 16:
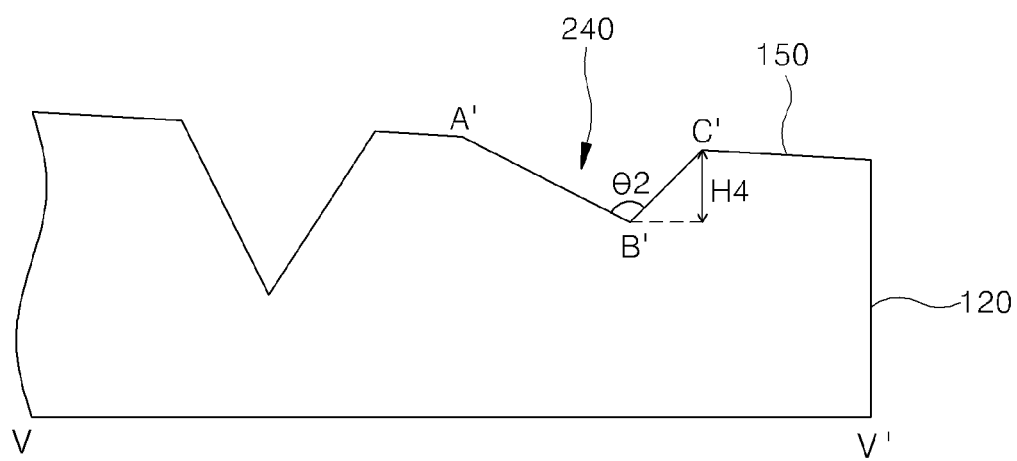
FIG. 16 is a cross-sectional view taken along line V-V' of FIG. 15.

Meanwhile, as shown in FIGS. 15 and 16, the reflection pattern 240 may be formed to have an intaglio prism shape engraved from the rear surface 150.

The reflection pattern 240 having the intaglio prism shape may have a vertex angle $\theta_2$, a height H4 and a width W', which may be the same or substantially the same as the vertex angle $\theta_1$, the height H3 and the width W of the reflection pattern 240 engraved in relief shown in FIGS. 13 and 14. As shown in FIG. 16, the vertex angle $\theta_2$ of triangle A'B'C' is formed in the range of about 130° to about 140°, which may be the same as the vertex angle $\theta_1$ of triangle ABC shown in FIG. 14. Moreover, the height H4 of the reflection pattern 240 engraved in intaglio has a value in the range of about 1 μm to about 10 μm, which may be the same as the height H3 of the reflection pattern 240 engraved in relief as shown in FIG. 14.

The size or the number of such reflection patterns 240 may be increased as a distance increases from the light incident surface 110 toward the opposite surface 120, and thus it is possible to increase the brightness of both sides of the light guide plate 100. Since the method of increasing the size and number of reflection patterns 240 for the exemplary embodiment described with respect to FIGS. 15 and 16 may be the same as described above with respect to the exemplary embodiment described with respect to FIGS. 12 to 14, a detailed description thereof will be omitted.

A fine intaglio or relief pattern is formed on a mold to form such a reflection pattern 240. In this case, the fine intaglio or relief pattern formed on the mold may have a size corresponding to that of the reflection pattern 240. Here, since the size of the intaglio or relief pattern is very small, a mechanical indentation method may be used.

Another exemplary embodiment of the light guide plate 100 in accordance with the present invention may include the diffuse reflection pattern 200 shown in FIGS. 4 to 6 formed on any one of both lateral surfaces 140 and the light emitting surface 130. Moreover, it will be understood by those skilled in the art that the second prism pattern 230 shown in FIG. 11 may be further formed on the light emitting surface 130 of the light guide plate 100. In other words, any combinations of the above-described exemplary embodiments of the light guide plate 100 are also within the scope of these embodiments.

As described above, the light guide plate and the backlight unit in accordance with the exemplary embodiments of the present invention include the diffuse reflection pattern subjected to the surface roughness treatment formed on any one of the lateral surface and the light emitting surface of the light guide plate to increase the brightness of both corners adjacent the opposite surface, thus achieving the uniform brightness of the entire light guide plate.

Moreover, the brightness of both corners adjacent the opposite surface may be increased by forming the prism pattern on the rear surface and forming the height of the prism pattern in a central region thereof adjacent to the opposite surface greater than that of the prism pattern at the lateral surface.

Furthermore, the brightness of both sides of the light guide plates may be increased by forming the reflection pattern between the prism patterns on the rear surface.

While the present invention has been shown and described with reference to some exemplary embodiments thereof, it should be understood by those of ordinary skill in the art that various changes in form and details may be made therein without departing from the spirit and the scope of the present is invention as defined by the appended claims.

What is claimed is:

1. A light guide plate comprising:
    a light incident surface to which light is incident as incident light;
    an opposite surface formed opposite to the light incident surface;
    a light emitting surface through which the incident light is emitted;
    a rear surface formed opposite to the light emitting surface and including a prism pattern to reflect the incident light to the light emitting surface; and
    lateral surfaces,
    wherein a diffuse reflection pattern is formed on at least any one of the light emitting surface and the lateral surfaces to diffuse-reflect light incident to the lateral surfaces, thus rendering a brightness adjacent both the opposite surface and the light incident surface substantially uniform,
    wherein the rear surface further comprises at least one reflection pattern formed in a prism shape spaced apart from and interposed between prism lines defining the prism pattern to reflect light to the light emitting surface,
    wherein the reflection pattern has a height from the rear surface different from a height of the prism lines defining the prism pattern from the rear surface.

2. The light guide plate of claim 1, wherein the reflection pattern is formed within a region of the rear surface occupying about 10% of a length between the lateral surfaces, and the region is disposed adjacent at least one of the lateral surfaces.

3. The light guide plate of claim 2, wherein the reflection pattern is formed in any one of relief and intaglio patterns.

4. The light guide plate of claim 3, wherein the reflection pattern has a vertex angle in a range of about 130° to about 140°.

5. The light guide plate of claim 4, wherein the reflection pattern has a height in a range of about 1 µm to about 10 µm from the rear surface and a width in a range of several tens to several hundreds of micrometers.

6. The light guide plate of claim 5, wherein a number of reflection patterns increases as a distance increases from the light incident surface toward the opposite surface.

7. The light guide plate of claim 5, wherein at least any one of the height and the width of the reflection pattern gradually increases as a distance increases from the light incident surface toward the opposite surface.

8. The light guide plate of claim 1, wherein the reflection pattern is formed as a projection extending from the rear surface and formed spaced apart from and interposed between intaglio prism lines defining the prism pattern.

* * * * *